(12) United States Patent
Serai et al.

(10) Patent No.: US 10,443,468 B2
(45) Date of Patent: Oct. 15, 2019

(54) FUEL ADDITION SYSTEM

(71) Applicants: SOKEN INC., Nishio-shi, Aichi (JP); TOYOTA JIDOSHA KABUSHIKI KAISHA, Toyota-shi, Aichi-ken (JP)

(72) Inventors: Tetsuro Serai, Kariya (JP); Kenichi Tomomatsu, Kasugai (JP); Takayoshi Kojima, Kariya (JP); Naoki Toda, Okazaki (JP); Kazuhiro Umemoto, Ebina (JP); Toshihiro Mori, Gotenba (JP); Hiromasa Nishioka, Susono (JP)

(73) Assignees: Soken, Inc., Nishio-shi, Aichi (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 135 days.

(21) Appl. No.: 15/869,428

(22) Filed: Jan. 12, 2018

(65) Prior Publication Data

US 2018/0238218 A1 Aug. 23, 2018

(30) Foreign Application Priority Data

Feb. 21, 2017 (JP) ................................ 2017-030242

(51) Int. Cl.
*F01N 9/00* (2006.01)
*F01N 3/20* (2006.01)
*F01N 3/36* (2006.01)

(52) U.S. Cl.
CPC ............. *F01N 3/2033* (2013.01); *F01N 3/36* (2013.01); *F01N 9/00* (2013.01); *F01N 2610/03* (2013.01); *F01N 2610/144* (2013.01); *F01N 2610/1433* (2013.01); *F01N 2900/1404* (2013.01); *Y02T 10/26* (2013.01); *Y02T 10/47* (2013.01)

(58) Field of Classification Search
CPC ...... F01N 3/025; F01N 3/0253; F01N 3/2033; F01N 3/36; F01N 2610/03; F01N 2900/1808; F01N 2900/1811; F02D 2200/0606; F02D 2200/0608
See application file for complete search history.

(56) References Cited

U.S. PATENT DOCUMENTS

2009/0007545 A1* 1/2009 Kameda ............. B01D 53/9431
60/286

FOREIGN PATENT DOCUMENTS

JP 2008-38818 2/2008
JP 2010-31675 2/2010

* cited by examiner

*Primary Examiner* — Jonathan R Matthias
(74) *Attorney, Agent, or Firm* — Finnegan, Henderson, Farabow, Garrett & Dunner, LLP

(57) ABSTRACT

The fuel addition system comprises: a fuel addition valve, a fuel tank, a first pressure storage chamber storing fuel to be supplied to a fuel injector, a supply pump increasing a pressure of fuel inside the fuel tank and supplying the fuel to the first pressure storage chamber, a pressure reduction valve discharging fuel stored in the first pressure storage chamber, a pressure reduction fuel passage supplying fuel discharged from the first pressure storage chamber to the fuel addition valve, and a control device controlling the fuel addition valve and the pressure reduction valve. The control device detects or estimates a temperature of fuel supplied to the fuel addition valve and, when injecting fuel from the fuel addition valve, controls an amount of fuel discharged from the first pressure storage chamber through the pressure reduction valve so that the temperature of the fuel becomes a reference temperature or more.

14 Claims, 8 Drawing Sheets

FUEL ADDITION SYSTEM

TECHNICAL FIELD

The present invention relates to a fuel addition system.

BACKGROUND ART

It has been known in the past to provide an exhaust purification catalyst such as an $NO_X$ storage reduction catalyst or oxidation catalyst in an exhaust passage of an internal combustion engine and to supply fuel as a reducing agent to the exhaust purification catalyst. For example, fuel is supplied by a fuel addition valve arranged an the exhaust passage at an upstream side from the exhaust purification catalyst.

To promote an oxidation reduction reaction in an exhaust purification catalyst, desirably the fuel injected from the fuel addition valve is made to vaporize or atomize inside the exhaust passage to raise the diffusibility of the fuel. To make fuel vaporize or atomize even if the temperature inside the exhaust passage is low, it is necessary to make the fuel injected from the fuel addition valve to the exhaust passage a high temperature. Further, to promote an oxidation reduction reaction at the exhaust purification catalyst, it is necessary to maintain the temperature of the exhaust purification catalyst at the activation temperature or more. However, if low temperature fuel is injected from the fuel addition valve into the exhaust passage, the latent heat of vaporization of the fuel causes the exhaust gas to fall in temperature and the exhaust purification catalyst to be cooled.

Therefore, to promote the oxidation reduction reaction at an exhaust purification catalyst, it is necessary to make the fuel injected from the fuel addition valve to the exhaust passage a high temperature. Regarding this, in the fuel addition system according to PLT 1, it is described to return the fuel heated by the heat of the internal combustion engine to the inside of a holding container inside the fuel tank and to supply the fuel inside the holding container to the fuel addition valve.

CITATION LIST

Patent Literature

PLT 1: Japanese Patent Publication No. 2010-031675A
PLT 2: Japanese Patent Publication No. 2008-038818A

SUMMARY OF INVENTION

Technical Problem

However, in such a fuel addition system, the fuel in the holding container is directly supplied to the fuel addition valve. For this reason, to raise the temperature of the fuel injected from the fuel addition valve to the exhaust passage, it is necessary to raise the temperature of the fuel as a whole inside the holding container. Therefore, a lot of heat is required. Further, at the time of cold start etc., if the temperature of the internal combustion engine is low, the fuel is not heated by the heat of the internal combustion engine, so the fuel inside the holding container is not raised in temperature. For this reason, a further method for increasing the temperature of fuel injected from a fuel addition valve to the exhaust passage has been desired.

Therefore, an object of the present invention is to provide a fuel addition system able to promote an increase in temperature of fuel injected from a fuel addition valve to an exhaust passage.

Solution to Problem

The summary of the present disclosure is as follows.

(1) A fuel addition system comprising: a fuel addition valve injecting fuel into an exhaust passage of an internal combustion engine, a fuel tank storing fuel, a first pressure storage chamber storing fuel to be supplied to a fuel injector provided in a cylinder of the internal combustion engine a supply pump increasing a pressure of fuel inside the fuel tank and supplying the fuel to the first pressure storage chamber, a pressure reduction valve discharging fuel stored in the first pressure storage chamber to thereby lower the pressure of the first pressure storage chamber, a pressure reduction fuel passage supplying fuel discharged from the first pressure storage chamber through the pressure reduction valve to the fuel addition valve, and a control device configured to control the fuel addition valve and the pressure reduction valve, wherein the control device is configured to detect or estimate a temperature of fuel supplied to the fuel addition valve and, when injecting fuel from the fuel addition valve, control an amount of fuel discharged from the first pressure storage chamber through the pressure reduction valve so that the temperature of the fuel becomes a reference temperature or more.

(2) The fuel addition system described in above (1), wherein the control device is configured to increase the amount of the fuel if the temperature of the fuel is lower than the reference temperature compared to if the temperature of the fuel is the reference temperature or more.

(3) The fuel addition system described in above (1) or (2), further comprising a second pressure storage chamber arranged in the pressure reduction fuel passage and storing fuel to be supplied to the fuel addition valve.

(4) The fuel addition system described in above (1) or (2), further comprising a feed pump supplying fuel inside the fuel tank to the fuel addition valve.

(5) The fuel addition system described in above (4), wherein the control device is configured to increase the amount of the fuel increase if the temperature of the fuel is lower than the reference temperature compared to if the temperature of the fuel is the reference temperature or more, calculate a pressure pulsation of the fuel discharged from the first pressure storage chamber through the pressure reduction valve, and synchronize an injection timing of the fuel addition valve with the pressure pulsation.

(6) The fuel addition system described in above (4) or (5), further comprising a first check valve preventing backflow of fuel supplied from the first pressure storage chamber through the pressure reduction valve to the fuel addition valve, and a second check valve preventing backflow of fuel supplied by the feed Pump to the fuel addition valve.

(7) The fuel addition system described in any one of above (1) to (6), further comprising a return passage returning fuel discharged from the first pressure storage chamber through the pressure reduction valve to the fuel tank, and a relief valve arranged in the return passage so as to maintain a pressure of fuel supplied from the first pressure storage chamber to the fuel addition valve at a predetermined value or less.

(8) The fuel addition system described in any one of above (1) to (7), wherein the control device is configured to detect or estimate an exhaust temperature inside the exhaust passage and calculate the reference temperature based on the exhaust temperature.

Advantageous Effects of Invention

According to the present invention, there is provided a fuel addition system able to promote an increase in temperature of fuel injected from a fuel addition valve to an exhaust passage.

DESCRIPTION OF EMBODIMENTS

Figure 1:
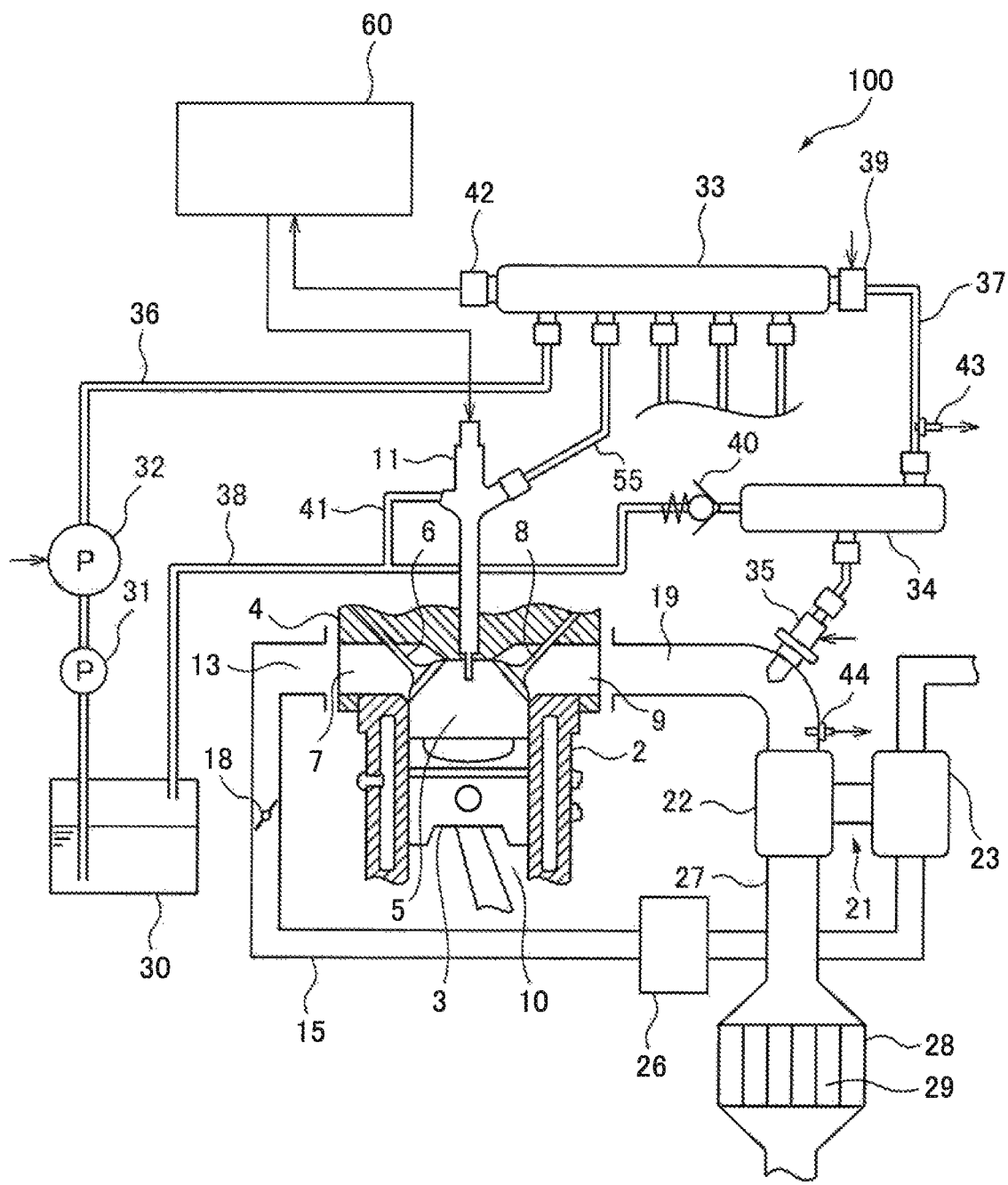
FIG. 1 is a view schematically showing an internal combustion engine in which a fuel addition system according to a first embodiment of the present invention is provided.

Below, referring to the figures, embodiments of the present invention will be explained in detail. Note that, in the following explanation, similar components are assigned the same reference numerals.

First Embodiment

Below, referring to FIG. 1 to FIG. 4, a first embodiment of the present invention will be explained.

Explanation of Internal Combustion Engine Overall

FIG. 1 is a view schematically showing an internal combustion engine in which a fuel addition system according to a first embodiment of the present invention is provided. An internal combustion engine 100 shown in FIG. 1 is a compression self-ignition type internal combustion engine (diesel engine). The internal combustion engine 100 is mounted in a vehicle.

The internal combustion engine 100 is provided with an engine body including a cylinder block 2 and a cylinder head 4. Inside of the cylinder block 2, a plurality of cylinders 10 are formed. The number of cylinders 10 is for example four. In the cylinders 10, pistons 3 moving back and forth in the axial line directions of the cylinders 10 are arranged. Combustion chambers 5 are formed between the pistons 3 and the cylinder head 4. The internal combustion engine 100 is provided with electronic control type fuel injectors 11 injecting fuel into the combustion chambers 5. The fuel injectors 11 are fastened to the cylinder head 4. The fuel injectors 11 inject fuel into the combustion chambers 5.

The cylinder head 4 is formed with intake ports 7 and exhaust ports 9. The intake ports 7 and exhaust ports 9 are connected to the combustion chambers 5. Intake valves 6 are arranged at the end parts of the intake ports 7 and are formed so as to be able to open and close the intake ports 7. Exhaust valves 8 are arranged at the end parts of the exhaust ports 9 and are formed so as to be able to open and close the exhaust ports 9.

The internal combustion engine 100 is provided with a supercharger comprised of a turbocharger 21. The turbocharger 21 includes a turbine 22 arranged in an exhaust passage and a compressor 23 arranged in an intake passage. If the turbine 22 turns due to flow of exhaust, the compressor 23 also turns and raises the pressure of the intake air. Therefore, the turbocharger 21 uses the energy of the exhaust gas to compress the intake air and increase the amount of intake air.

Each intake port 7 is connected via a corresponding intake runner 13 to an intake pipe 15. The intake pipe 15 is connected to the compressor 23 of the turbocharger 21. At the inside of the intake pipe 15, a throttle valve 18 able to change the open area of the intake passage is arranged. Further, at the intake pipe 15 between the compressor 23 and the throttle valve 18, a cooler (intercooler) 26 for cooling the intake air compressed by the turbocharger 21 is arranged. The intake ports 7, intake runners 13, intake pipe 15, etc., form an intake passage guiding air to the combustion chambers 5.

Each exhaust port 9 is connected to an exhaust manifold 19. The exhaust manifold 19 has a plurality of branches connected to the exhaust ports 9 and a header where the branches merge. The header of the exhaust manifold 19 is connected to the turbine 22. The turbine 22 is connected through an exhaust pipe 27 to a casing 28 housing an exhaust purification catalyst 29. The exhaust ports 9, exhaust manifold 19, exhaust pipe 27, etc., form an exhaust passage discharging exhaust gas produced by combustion of an air-fuel mixture from the combustion chambers 5.

The exhaust purification catalyst 29 is, for example, an $NO_X$ storage reduction catalyst (NSR catalyst). The NSR catalyst includes a catalyst support, and a precious metal and storage substance supported on the catalyst support. In the NSR catalyst, when the oxygen concentration in the exhaust gas is high, that is, when the air-fuel ratio of the exhaust gas is leaner than a stoichiometric air-fuel ratio, the nitrogen oxide component (NO) contained in the exhaust gas is oxidized on the precious metal and is stored as $NO_X$ at the storage substance. On the other hand, when the oxygen concentration in the exhaust gas is low, that is, when the air-fuel ratio of the exhaust gas is richer than the stoichiometric air-fuel ratio, the $NO_X$ which had been stored at the storage substance is released and the released. $NO_X$ is removed by reduction on the precious metal by the hydrogen ($H_2$), carbon monoxide (CO), hydrocarbons (HC), and other reducing components in the exhaust gas. For this reason, by periodically supplying the reducing agent comprised of fuel to the NSR catalyst, it is possible to remove the $NO_X$ in the exhaust gas. Note that the exhaust purification catalyst 29 may be another catalyst such as an oxidation catalyst.

The internal combustion engine 100 is provided with an electronic control unit 60 (ECU). The ECU 60 is a microcomputer provided with components connected with each other by bidirectional buses such as a central processing Unit (CPU), read only memory (ROM), random access memory (RAM), input port, and output port. The ECU 60 performs various types of control of the internal combustion engine 100 based on the outputs of the various types of sensors provided at the internal combustion engine 100. For example, the ECU 60 controls the injection timings and injection times (injection amounts) of the fuel injectors 11 based on the engine speed detected by the crank angle sensor, the engine load detected by the load sensor, etc. The ECU 60 is electrically connected to the fuel injectors 11. The output signals of the ECU 60 are sent to the fuel injectors 11. In the present embodiment, a single ECU 60 is provided, but a plurality of ECUs may be provided for the respective functions.

Note that, the internal combustion engine 100 may be a spark ignition type internal combustion engine in which spark plugs are arranged in the combustion chambers, in particular, a lean air-fuel mixture burn (lean burn) type gasoline engine. Further, the cylinder array, configuration of the intake and exhaust systems, presence of any supercharger and other specific configurations of the internal combustion engine 100 may be different from the constitution shown in FIG. 1. For example, an exhaust gas recirculation (EGR) passage connecting the intake passage and exhaust passage together may be provided in the internal combustion engine 100.

Fuel Addition System

Below, the configuration of a fuel addition system according to the first embodiment of the present invention will be explained. The fuel addition system is provided with a fuel tank 30, feed pump 31, supply pump 32, first pressure storage chamber 33, second pressure storage chamber 34, and fuel addition valve 35. Further, the fuel addition system is provided with a fuel pipe 36 connecting the fuel tank 30 and the first pressure storage chamber 33, a pressure reduction fuel passage 37 connecting the first pressure storage chamber 33 and the fuel addition valve 35, and a return passage 38 connecting the second pressure storage chamber 34 and the fuel tank 30. The fuel pipe 36 supplies fuel in the fuel tank 30 to the first pressure storage chamber 33. The pressure reduction fuel passage 37 supplies the fuel discharged from the first pressure storage chamber 33 through a later explained pressure reduction valve 39 to the fuel addition valve 35. The return passage 38 returns the fuel discharged through the pressure reduction valve 39 from the first pressure storage chamber 33 to the fuel tank 30.

The fuel tank 30 stores fuel. The fuel is for example diesel oil. The feed pump 31 pumps up the fuel in the fuel tank 30 and supplies it to the supply pump 32. The supply pump 32 raises the pressure of the fuel supplied from the feed pump 31, that is, the fuel in the fuel tank 30, and supplies it to the first pressure storage chamber 33. The feed pump 31 and supply pump 32 are arranged in the fuel pipe 36. The pressure of the fuel discharged from the supply pump 32 is higher than the pressure of the fuel discharged from the feed pump 31. For this reason, sometimes the feed pump 31 will be called the "low pressure pump" and the supply pump 32 will be called the "high pressure pump". Note that, the feed pump 31 may be arranged inside the fuel tank 30. Further, the feed pump 31 may be omitted. In this case, the supply pump 32 pumps up the fuel inside the fuel tank 30 and raises its pressure.

The fuel supplied from the supply pump 32 to the first pressure storage chamber 33 is stored in the first pressure storage chamber 33 and is held in the high pressure state. The fuel stored in the first pressure storage chamber 33 is supplied through a high pressure fuel passage 55 connecting the first pressure storage chamber 33 and the fuel injectors 11 to the individual fuel injectors 11. Therefore, the first pressure storage chamber 33 stores fuel to be supplied to the fuel injectors 11 provided at the cylinders 10 of the internal combustion engine 100. The first pressure storage chamber 33 is a so-called "common rail".

Further, the fuel addition system is provided with a pressure reduction valve 39 attached to the first pressure storage chamber 33 and a relief valve 40 arranged in the return passage 38. The pressure reduction valve 39 is arranged at one end part of the first pressure storage chamber 33. The pressure reduction valve 39 discharges the fuel stored in the first pressure storage chamber 33 to thereby cause the pressure inside the first pressure storage chamber 33 to fall. The fuel inside the first pressure storage chamber 33 is discharged through the pressure reduction valve 39 into the pressure reduction fuel passage 37. The fuel discharged into the pressure reduction fuel passage 37 is supplied to the fuel addition valve 35. For this reason, in the present embodiment, the passage connecting the fuel tank 30 and the fuel addition valve 35 does not have to be separately provided. Therefore, the configuration for supplying fuel to the fuel injectors 11 and fuel addition valve 35 can be made simple.

The fuel addition valve 35 is an electronic control type injector and injects fuel into the exhaust passage at the upstream side from the exhaust purification catalyst 29 in the direction of flow of exhaust. As a result, fuel is supplied from the fuel addition valve 35 to the exhaust purification catalyst 29 via the exhaust gas inside the exhaust passage. The fuel addition valve 35 is arranged in the exhaust passage at the upstream side from the exhaust purification catalyst 29 in the direction of flow of exhaust. Specifically, the fuel addition valve 35 is arranged in the exhaust pipe 27 at the upstream side from the turbine 22 in the direction of flow of exhaust. Note that, the fuel addition valve 35 may be arranged between the turbine 22 and the exhaust purification catalyst 29 in the exhaust pipe 27.

The second pressure storage chamber 34 is arranged at the pressure reduction fuel passage 37 and stores fuel to be supplied to the fuel addition valve 35. The relief valve 40 is a check value which allows the flow of fuel from the second pressure storage chamber 34 to the fuel tank 30 and prohibits the reverse flow. The relief valve 40 opens if the pressure of the second pressure storage chamber 34 becomes higher than a predetermined value, and returns the fuel inside the second pressure storage chamber 34 through the return passage 38 to the fuel tank 30. Further, the pressure of the fuel in the pressure reduction fuel passage 37, second pressure storage chamber 34, and fuel addition valve 35 is the same. Therefore, the relief valve 40 can maintain the pressure of the fuel supplied from the first pressure storage chamber 33 to the fuel addition valve 35 at a predetermined value or less. Note that, the pressure where the relief valve 40 is opened, that is, the maximum pressure of the fuel supplied from the pressure reduction fuel passage 37 to the fuel addition valve 35, is set to a value lower than the pressure of the fuel stored in the first pressure storage chamber 33.

A leak fuel pipe 41 is connected to the return passage 38. The leak fuel pipe 41 connects the fuel injectors 11 and the return passage 38. The leak fuel pipe 41 supplies the fuel not injected from the fuel injectors 11 to the insides of the combustion chambers 5 to the return passage 38. The fuel supplied to the return passage 38 is returned to the fuel tank 30.

Further, the fuel addition system is provided with a control device controlling the supply pump 32, pressure reduction valve 39, and fuel addition valve 35. In the present embodiment, the ECU 60 corresponds to the control device. The ECU 60 is electrically connected to the supply pump 32, pressure reduction valve 39, and fuel addition valve 35. The output signals of the ECU 60 are sent to the supply pump 32, pressure reduction valve 39, and fuel addition valve 35.

Further, the fuel addition system is provided with a common rail pressure sensor 42 detecting the pressure of the fuel stored in the first pressure storage chamber 33 (common rail pressure). The common rail pressure sensor 42 is arranged at the other end part of the first pressure storage chamber 33, that is, the end part at the opposite side from the pressure reduction valve 39. The output of the common rail pressure sensor 42 is sent to the ECU 60. The ECU 60 controls the amount of discharge of the supply pump 32 and the amount of fuel discharged through the pressure reduction valve 39 from the first pressure storage chamber 33 (below, referred to as the "amount of discharge of the pressure reduction valve 39") so that the common rail pressure detected by the common rail pressure sensor 42 becomes a predetermined pressure. Further, the ECU 60 controls the injection timing and injection time (amount of injection) of the fuel addition valve 35.

Further, the ECU 60 performs the control explained below so as to promote the oxidation reduction reaction at the exhaust purification catalyst 29 and thereby raise the temperature of the fuel injected from the fuel addition valve 35 to the exhaust passage. Usually, when fuel passes the pressure reduction valve 39, an eddy occurs inside the pressure reduction valve 39 at the location where the direction of flow of fuel greatly changes. Further, at the venturi part of the pressure reduction valve 39, the flow rate of the fuel becomes fast, so the friction between the fuel and flow path becomes greater. For this reason, when the fuel passes through the pressure reduction valve 39, loss of the fluid energy of the fuel occurs and the fluid energy is converted to heat energy. As a result, if fuel passes through the pressure reduction valve 39, the temperature of the fuel increases. For this reason, if fuel is supplied through the pressure reduction valve 39 to the pressure reduction fuel passage 37, the temperature of the fuel inside the pressure reduction fuel passage 37, that is, the temperature of the fuel injected from the fuel addition valve 35, becomes higher. If the temperature around the supply path of fuel to the fuel addition valve 35 is the same, the greater the amount of discharge of the pressure reduction valve 39, the higher the temperature of the fuel injected from the fuel addition valve 35 becomes.

For this reason, the ECU 60 detects or estimates the temperature of the fuel supplied to the fuel addition valve 35 (below, referred to as the "supplied fuel temperature"), and if injecting fuel from the fuel addition valve 35, controls the amount of discharge of the pressure reduction valve 39 so that the supplied fuel temperature becomes a reference temperature or more. Due to this control, the fuel addition system can promote the increase of temperature of the fuel injected from the fuel addition valve 35 to the exhaust passage.

The ECU 60 increases the amount of discharge of the pressure reduction valve 39 if the supplied fuel temperature is lower than a reference temperature compared to if the supplied fuel temperature is the reference temperature or more. For example, the ECU 60 lengthens the open time of the pressure reduction valve 39 to increase the amount of discharge of the pressure reduction valve 39. In this case, the ECU 60 lengthens the open time of the pressure reduction valve 39 if the supplied fuel temperature is lower than the reference temperature compared to if the supplied fuel temperature is the reference temperature or more. The ECU 60 increases the amount of discharge of the supply pump 32 so as to suppress a drop in pressure of the fuel stored in the first pressure storage chamber 33 while the pressure reduction valve 39 is opened, compared to when the pressure reduction valve 39 is closed. Note that, when the opening degree of the pressure reduction valve 39 can be changed, the ECU 60 may increase the opening degree of the pressure reduction valve 39 to thereby increase the amount of discharge of the pressure reduction valve 39. In this case, the ECU 60 enlarges the opening degree of the pressure reduction valve 39 if the supplied fuel temperature is lower than the reference temperature compared to if the supplied fuel temperature is the reference temperature or more.

Further, the fuel addition system is provided with a fuel temperature sensor 43 detecting the supplied fuel temperature. The fuel temperature sensor 43 is arranged at the pressure reduction fuel passage 37. The fuel temperature sensor 43 is electrically connected to the ECU 60. The output of the fuel temperature sensor 43 is sent to the ECU 60. The ECU 60 uses the fuel temperature sensor 43 to detect the supplied fuel temperature. Note that the fuel temperature sensor 43 may be arranged at the inside of the fuel addition valve 35 or in the second pressure storage chamber 34. Further, the ECU 60 may estimate the supplied fuel temperature based on the output of an outside air temperature sensor detecting the outside air temperature of the internal combustion engine 100, the output of a water temperature sensor detecting the temperature of cooling water of the internal combustion engine 100, the amount of discharge of the pressure reduction valve 39, etc. In this case, the fuel temperature sensor 43 may be omitted.

Explanation of Control Using Time Chart

Figure 2:
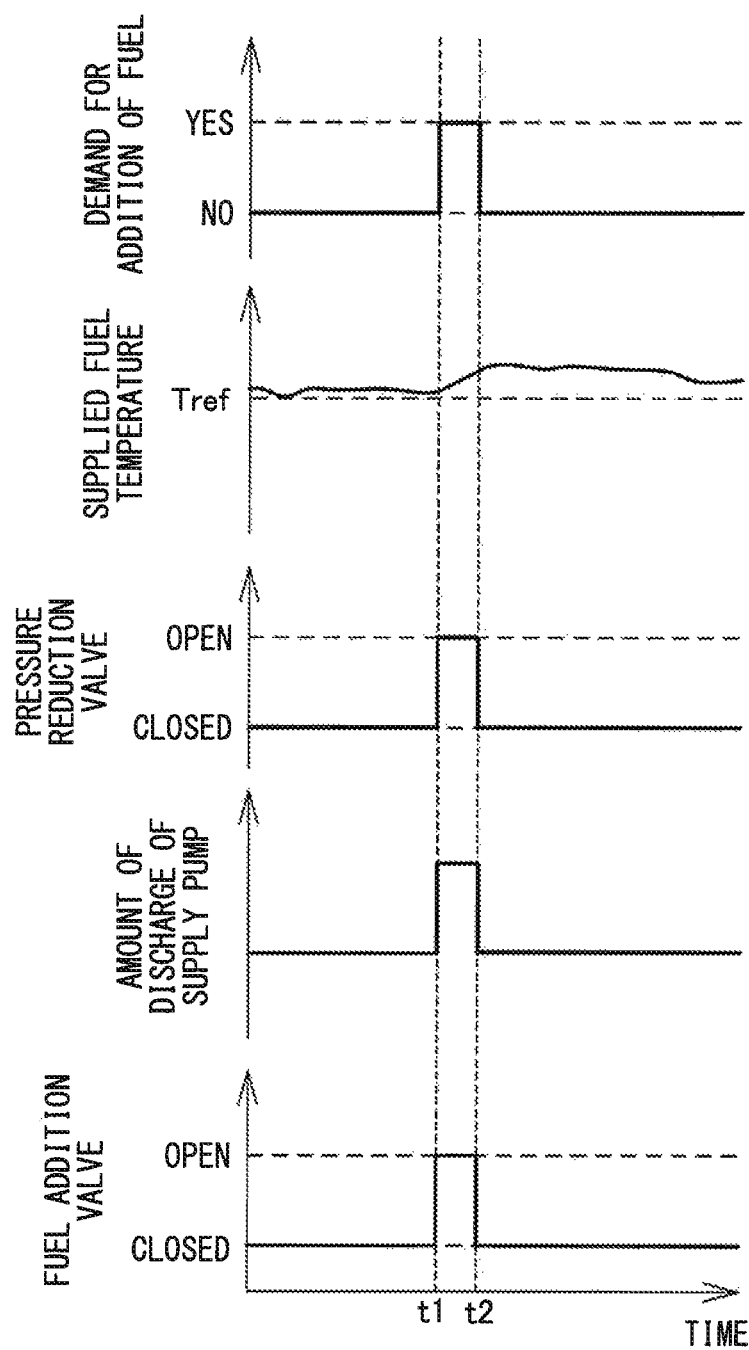
FIG. 2 is a time chart of presence of any demand for addition of fuel etc.
Figure 3:
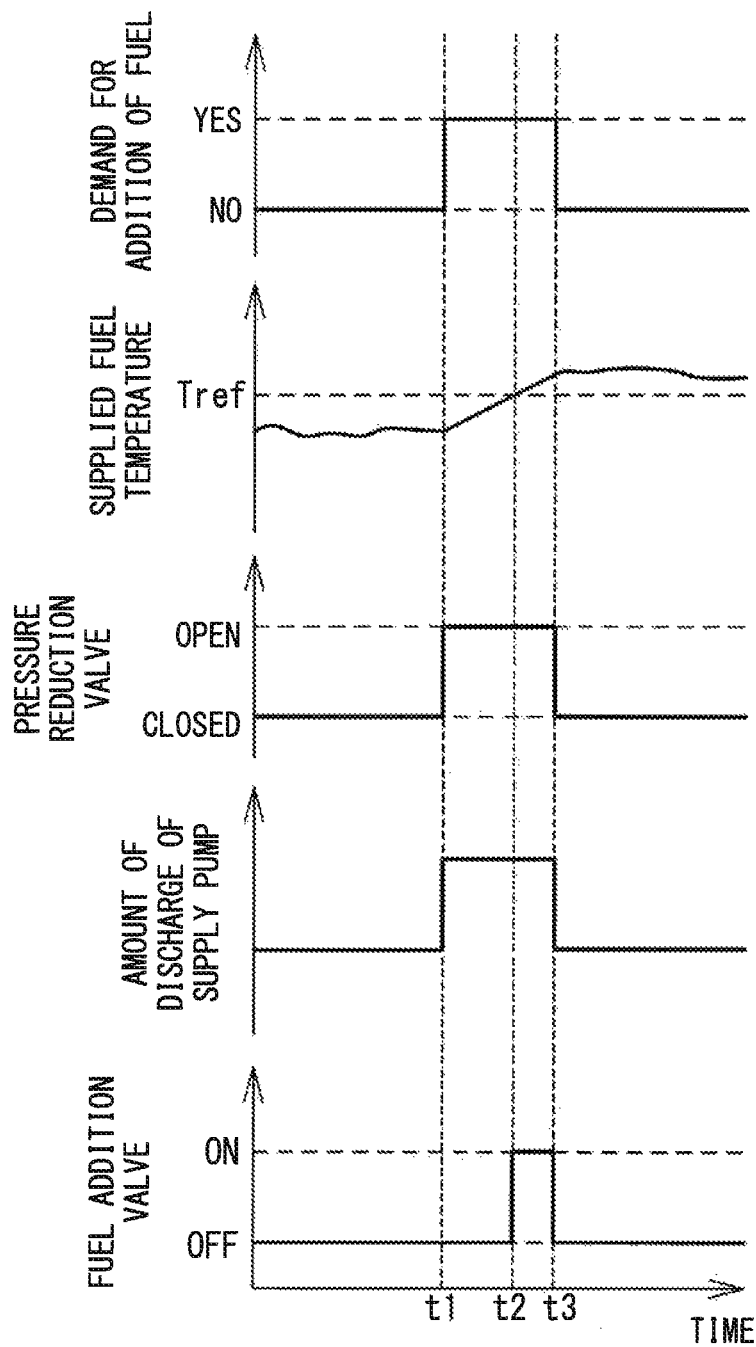
FIG. 3 is a time chart of presence of any demand for addition of fuel etc.

Below, referring to the time charts of FIG. 2 and FIG. 3, control of the fuel addition system will be specifically explained. FIG. 2 and FIG. 3 are schematic time charts of the presence of any demand for the addition of fuel, supplied fuel temperature, opening/closing of the pressure reduction valve 39, amount of discharge of the supply pump 32, and opening/closing of the fuel addition valve 35. FIG. 2 shows the case where the supplied fuel temperature is the reference temperature Tref or more when the addition of fuel is demanded. On the other hand, FIG. 3 shows the case where the supplied fuel temperature is lower than the reference temperature Tref when the addition of fuel is demanded.

First, the time chart of FIG. 2 will be explained. In the example shown in FIG. 2, at the time t1, the addition of fuel, that is, fuel injection of the fuel addition valve 35, is demanded. For this reason, the pressure reduction valve 39 is opened so as to supply the amount of fuel required for fuel injection from the first pressure storage chamber 33 to the fuel addition valve 35. When the pressure reduction valve 39 is opened, the amount of discharge of the supply pump 32 is increased so as to suppress a drop of pressure of the fuel stored in the first pressure storage chamber 33. Note that, even before there is a demand for the addition of fuel, fuel is supplied from the first pressure storage chamber 33 to the fuel addition valve 35 while the pressure reduction valve 39 is opened so as to lower the common rail pressure.

Further, at the time t1, the supplied fuel temperature is the reference temperature Tref or more. For this reason, at the time t1, the fuel addition valve 35 is opened and fuel injection of the fuel addition valve 35 is started. When a predetermined amount of fuel is injected from the fuel addition valve 35 to the inside of the exhaust pipe 27, at the time t2, the fuel addition valve 35 is closed and fuel injection of the fuel addition valve 35 is stopped. Along with this, at the time t2, the pressure reduction valve 39 is closed, and the amount of discharge of the supply pump 32 is decreased.

Next, the time chart of FIG. 3 will be explained. In the same way as the example shown in FIG. 2, at the time t1, the addition of fuel is demanded. For this reason, the pressure reduction valve 39 is opened so as to supply the amount of fuel required for fuel injection from the first pressure storage chamber 33 to the fuel addition valve 35. When the pressure reduction valve 39 is opened, the amount of discharge of the supply pump 32 is increased so as to suppress a drop in pressure of the fuel stored in the first pressure storage chamber 33.

Further, at the time t1, the supplied fuel temperature is lower than the reference temperature Tref. For this reason, at the time t1, fuel injection of the fuel addition valve 35 is not started. After the time t1, the state where the pressure reduction valve 39 is opened is maintained so as to increase the supplied fuel temperature. At the time t2, the supplied fuel temperature reaches the reference temperature Tref. For this reason, at the time t2, the fuel addition valve 35 is opened and fuel injection of the fuel addition valve 35 is started. When a predetermined amount of fuel is injected from the fuel addition valve 35 to the inside of the exhaust pipe 27, at the time t3, the fuel addition valve 35 is closed and fuel injection of the fuel addition valve 35 is stopped. Along with this, at the time t3, the pressure reduction valve 39 is closed, and the amount of discharge of the supply pump 32 is decreased. In the example of FIG. 3, compared with the example of FIG. 2, the open time of the pressure reduction valve 39 is made longer, so the amount of discharge of the pressure reduction valve 39 is increased.

Processing for Addition of Fuel

Figure 4:
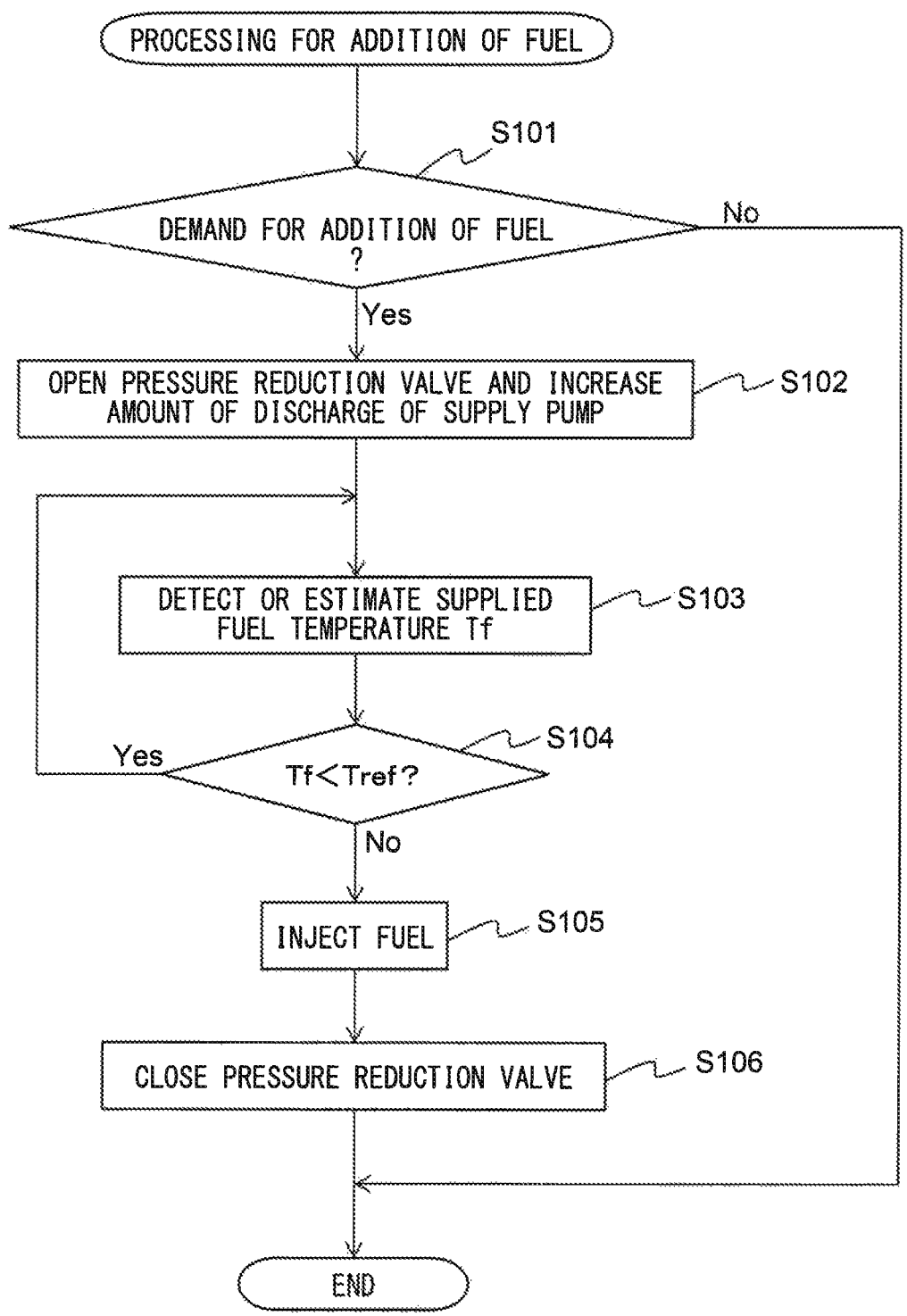
FIG. 4 is a flow chart showing a control routine of processing for fuel addition in the first embodiment of the present invention.

Below, the control when adding fuel to the exhaust passage using the fuel addition system will be explained with reference to the flow chart of FIG. 4. FIG. 4 is a flow chart showing the control routine of processing for addition of fuel in the first embodiment of the present invention. The present control routine is repeatedly performed by the ECU 60 after startup of the internal combustion engine 100.

First, at step S101, it is judged whether there is a demand for addition of fuel, that is, a demand for injection of fuel from the fuel addition valve 35. If the exhaust purification catalyst 29 is an NSR catalyst, fuel is added to the inside of the exhaust pipe 27 so as to remove by reduction the $NO_X$ stored in the NSR catalyst. For this reason, for example, when the amount of storage of $NO_X$ in the NSR catalyst estimated based on the engine speed, amount of fuel injection from the fuel injectors 11, etc., is a predetermined value or more, injection of fuel of the fuel addition valve 35 is demanded. Further, if the exhaust purification catalyst 29 is an oxidation catalyst, fuel is added to the inside of the exhaust pipe 27 so that the particulate matter (PM) trapped in the filter arranged at the downstream side of the oxidation catalyst in the direction of flow of exhaust is burned away by the heat of reaction at the oxidation catalyst. For this reason, for example, if the amount of trapped PM of the filter estimated from the differential pressure before and after the filter etc., is a predetermined value or more, injection of fuel from the fuel addition valve 35 is demanded.

If at step S101 it is judged that there is no demand for addition of fuel, the present control routine is ended. On the other hand, if at step S101 it is judged that there is a demand for addition of fuel, the present control routine proceeds to step S102. At step S102, the pressure reduction valve 39 is opened so that the amount of fuel required for fuel injection is supplied from the first pressure storage chamber 33 to the fuel addition valve 35. Further, to suppress the drop in pressure of the fuel stored in the first pressure storage chamber 33, the amount of discharge of the supply pump 32 is increased.

Next, at step S103, the supplied fuel temperature Tf is detected or estimated by any of the above methods. Next, at step S104, it is judged whether the supplied fuel temperature Tf is lower than the reference temperature Tref. The reference temperature Tref is a value predetermined by calculation or experiments so that vaporization and atomization of The fuel injected from the fuel addition valve 35 are promoted.

If at step S104 it is judged that the fuel supply temperature Tf is the reference temperature Tref or more, the present control routine proceeds to step S105. At step S105, a predetermined amount of fuel is injected from the fuel addition valve 35. Next, at step S106, the pressure reduction valve 39 is closed. After step S106, the present control routine is ended.

On the other hand, if at step S104 it is judged that the supplied fuel temperature Tf is lower than the reference temperature Tref, the present control routine returns to step S103. Therefore, until the supplied fuel temperature Tf becomes the reference temperature Tref or more, the pressure reduction valve 39 is opened and the increased state of the amount of discharge of the supply pump 32 is maintained. For this reason, when there is a demand for addition of fuel, if the supplied fuel temperature Tf is lower than the predetermined temperature Tref, the open time of the pressure reduction valve 39 is made longer and the amount of discharge of the pressure reduction valve 39 is increased.

Note that, at step S102, only opening of the pressure reduction valve 39 may be performed. Further, if the opening degree of the pressure reduction valve 39 can be changed, when returning from step S104 to step S103, the opening degree of the pressure reduction valve 39 may be made larger and that opening degree may be maintained until the supplied fuel temperature Tf becomes the reference temperature Tref or more. In this case, when at step S102 the pressure reduction valve 39 is opened, the opening degree of the pressure reduction valve 39 is made smaller than the maximum value.

Second Embodiment

The fuel addition system according to the second embodiment basically is similar to the fuel addition system according to the first embodiment except for the points explained below. For this reason, below, the second embodiment of the present invention will be explained focusing on the parts different from the first embodiment.

The vaporization and atomization of the fuel injected from the fuel addition valve 35 are not only affected by the supplied fuel temperature, but are also affected by the exhaust temperature inside the exhaust passage. The higher the exhaust temperature, the larger the heat energy given from the exhaust gas to the fuel, so the vaporization and atomization of the fuel injected from the fuel addition valve 35 are promoted. For this reason, the supplied fuel temperature required for promoting the vaporization and atomization of the fuel is preferably set based on the exhaust temperature inside the exhaust passage.

Therefore, in the second embodiment, the ECU 60 detects or estimates the exhaust temperature inside the exhaust passage, calculates the reference temperature based on the exhaust temperature, and controls the amount of discharge of the pressure reduction valve so that the supplied fuel temperature becomes the reference temperature or more. Due to this, the supplied fuel temperature is controlled to a more suitable temperature considering the exhaust temperature, so vaporization and atomization of the fuel injected from the fuel addition valve 35 are promoted much more.

In the second embodiment, the fuel addition system is provided with an exhaust temperature sensor 44 detecting the exhaust temperature inside the exhaust passage. The exhaust temperature sensor 44 is arranged in the exhaust passage at the upstream side from the exhaust purification catalyst 29 in the direction of flow of exhaust. For example, as shown in FIG. 1, the exhaust temperature sensor 44 is arranged between the fuel addition valve 35 and turbine 22 inside the exhaust pipe 27. The exhaust temperature sensor 44 is electrically connected to the ECU 60, and the output of the exhaust temperature sensor 44 is sent to the ECU 60. The ECU 60 uses the exhaust temperature sensor 44 to detect the exhaust temperature inside the exhaust passage. Note that, the ECU 60 may estimate the exhaust temperature inside the exhaust passage based on the engine speed, amount of fuel injection from the fuel injectors 11, etc. In this case, the exhaust temperature sensor 44 may be omitted.

Processing for Addition of Fuel

Figure 5:
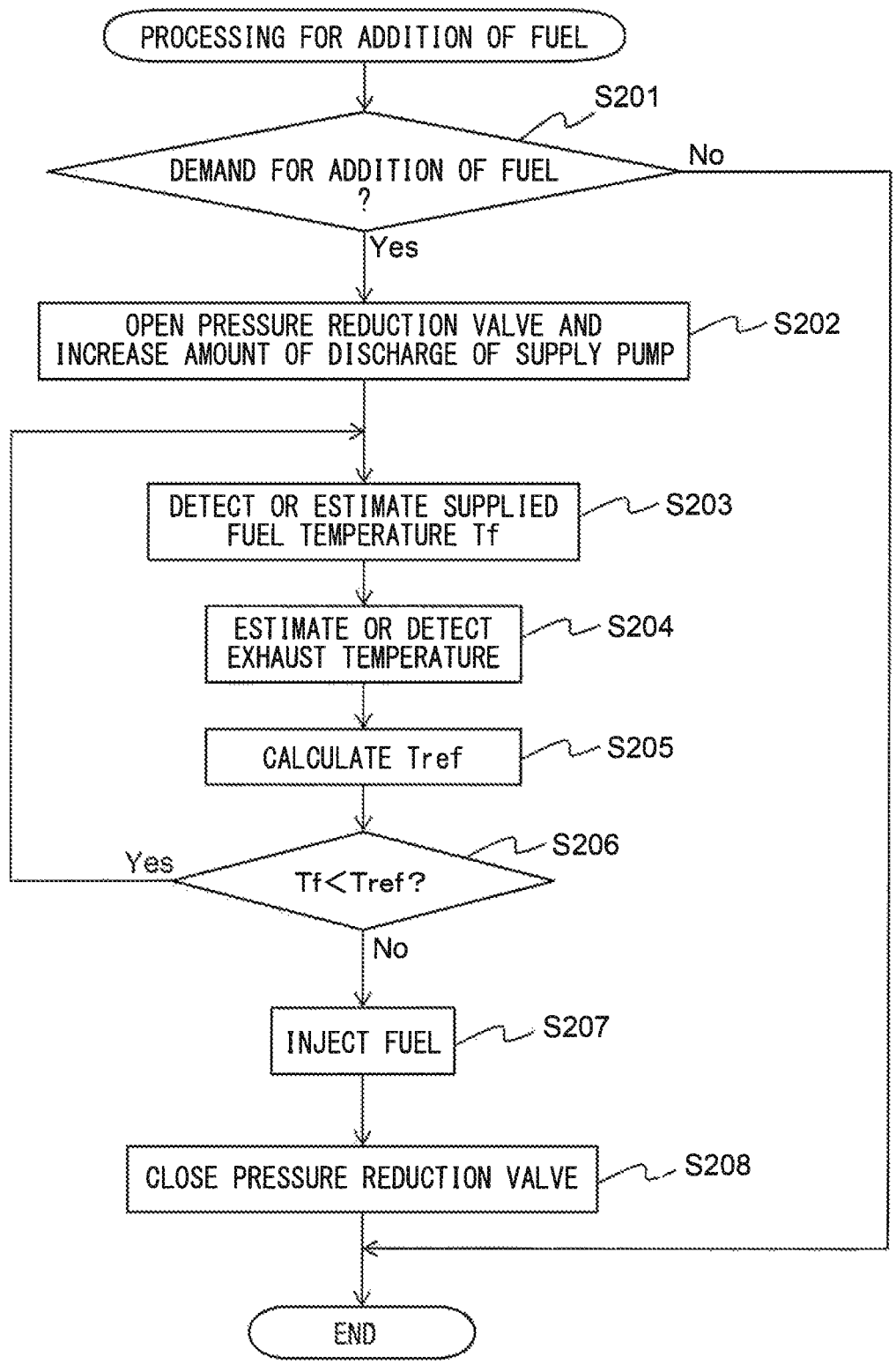
FIG. 5 is a flow chart showing a control routine of processing for fuel addition in a second embodiment of the present invention.

Below, the control when adding fuel to the exhaust passage using the fuel addition system in the second embodiment will be explained with reference to the flow chart of FIG. 5. FIG. 5 is a flow chart showing the control routine of processing for addition of fuel in the second embodiment of the present invention. The present control routine is repeatedly performed by the ECU 60 after startup of the internal combustion engine 100.

Step S201 to step S203 are similar to step S101 to step S103 at FIG. 4, so the explanation will be omitted. After step S203, at step S204, any of the above-mentioned methods is used to estimate or detect the exhaust temperature inside the exhaust passage. Next, at step S205, the reference temperature Tref is calculated based on the exhaust temperature estimated or detected at step S204. At this time, the reference temperature Tref is made lower the higher the exhaust temperature.

Next, at step S206, it is judged whether the supplied fuel temperature Tf is lower than the reference temperature Tref. If it is judged that the supplied fuel temperature Tf is the reference temperature Tref or more, the present control routine proceeds to step S207. On the other hand, if it is judged that the supplied fuel temperature if is lower than the reference temperature Tref, the present control routine returns to step S203. Step S207 and step S208 are similar to step S105 and step S106 at FIG. 4, so the explanation will be omitted.

Note that, in the same way as the control routine of FIG. 4, at step S202, only opening of the pressure reduction valve 39 may be performed. Further, if the opening degree of the pressure reduction valve 39 can be changed, when returning from step S206 to step S203, the opening degree of the pressure reduction valve 39 may be made larger and the opening degree may be maintained until the supplied fuel temperature Tf becomes the reference temperature Tref or more. In this case, when, at step S202, the pressure reduction valve 39 is opened, the opening degree of the pressure reduction valve 39 is made smaller than the maximum value.

Third Embodiment

The fuel addition system according to a third embodiment is basically similar to the fuel addition system according to the first embodiment except for the points explained below. For this reason, below, the third embodiment of the present invention will be explained focusing on parts different from the first embodiment.

Figure 6:
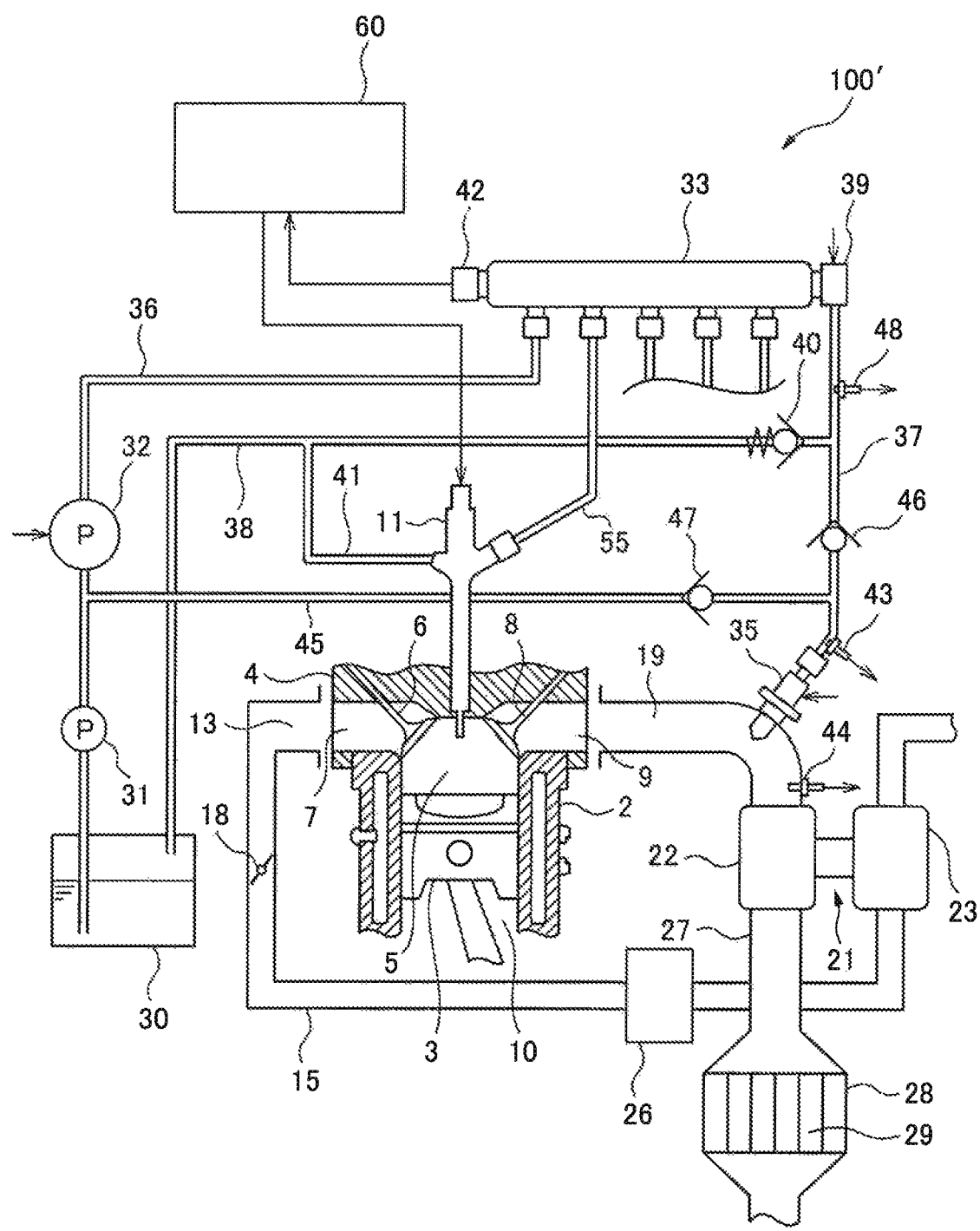
FIG. 6 is a view schematically showing an internal combustion engine in which a fuel addition system according to a third embodiment of the present invention is provided.

FIG. 6 is a view schematically showing an internal combustion engine at which the fuel addition system according to the third embodiment of the present invention is provided. The internal combustion engine 100' shown in FIG. 6 is a compression self-ignition type internal combustion engine (diesel engine). The internal combustion engine 100' is mounted in a vehicle.

Note that, in the same way as the first embodiment, the internal combustion engine 100' may be a spark ignition type internal combustion engine in which spark plugs are arranged in the combustion chambers, in particular, a lean air-fuel mixture burn (lean burn) type gasoline engine. Further, the cylinder array, configuration of the intake and exhaust systems, presence of any supercharger, and other specific configurations of the internal combustion engine 100' may be different from the constitution shown in FIG. 6.

Fuel Addition System

Below, the configuration of the fuel addition system according to the third embodiment of the present invention will be explained. The fuel addition system is provided with a fuel tank 30, feed pump 31, supply pump 32, first pressure storage chamber 33, and fuel addition valve 35. In the third embodiment, unlike the first embodiment, the fuel addition system is not provided with a second pressure storage chamber storing fuel to be supplied to the fuel addition valve 35.

Further, the fuel addition system is provided with a fuel pipe 36 connecting the fuel tank 30 and first pressure storage chamber 33, a pressure reduction fuel passage 37 connecting the first pressure storage chamber 33 and fuel addition valve 35, a return passage 38 connecting the pressure reduction fuel passage 37 and fuel tank 30, and a low pressure fuel passage 45 connecting the fuel pipe 36 and the pressure reduction fuel passage 37. The low pressure fuel passage 45 is connected to the pressure reduction fuel passage 37 at the fuel addition valve 35 side from the return passage 38 and is connected between the feed pump 31 and supply pump 32 in the fuel pipe 36. Further, in the same way as the first embodiment, a leak fuel pipe 41 is connected to the return passage 38.

The feed pump 31 pumps up fuel inside the fuel tank 30 and supplies it to the supply pump 32 and fuel addition valve 35. The feed pump 31 supplies the fuel inside the fuel tank 30 through the low pressure fuel passage 45 to the fuel addition valve 35. For this reason, even when the pressure reduction valve 39 is closed, the feed pump 31 can be used to supply fuel in the fuel tank 30 to the fuel addition valve 35. The pressure of the fuel supplied by the feed pump 31 to the fuel addition valve 35 is lower than the pressure of the fuel supplied through the pressure reduction valve 39 from the first pressure storage chamber 33 to the fuel addition valve 35. Note that, the feed pump 31 may be arranged in a passage separate from the fuel pipe 36 and supply the fuel inside the fuel tank 30 to only the fuel addition valve 35. In this case, the supply pump 32 pumps up the fuel inside the fuel tank 30 and raises its pressure.

Further, the fuel addition system is provided with a first check valve 46 arranged at the pressure reduction fuel passage 37, a second check valve 47 arranged in the low pressure fuel passage 45, and a relief valve 40 arranged in the return passage 38. The first check valve 46 is arranged at the pressure reduction fuel passage 37 at the fuel addition valve 35 side from the connecting part with the return passage 38. The first check valve 46 is a check valve allowing the flow of fuel from the first pressure storage chamber 33 to the fuel addition valve 35 and prohibiting the reverse flow. For this reason, the first check valve 46 prevents the backflow of fuel supplied from the first pressure storage chamber 33 through the pressure reduction valve 39 to the fuel addition valve 35. Further, the first check valve 46 prevents the fuel supplied by the feed pump 31 to the fuel addition valve 35 from passing through the pressure reduction fuel passage 37 toward the pressure reduction valve 39.

The second check valve 47 is a check valve allowing the flow of fuel from the feed pump 31 to the fuel addition valve 35 and prohibiting the reverse flow. For this reason, the second check valve 47 prevents the backflow of fuel supplied by the feed pump 31 to the fuel addition valve 35. Further, the second check valve 47 prevents the fuel supplied from the first pressure storage chamber 33 to the fuel addition valve 35 from flowing through the low pressure fuel passage 45 toward the feed pump 31.

The relief valve 40 is arranged in the return passage 38 at the pressure reduction fuel passage 37 side from the connecting part with the leak fuel pipe 41. The relief valve 40 is a check valve which allows the flow of fuel from the pressure reduction fuel passage 37 to the fuel tank 30 and prohibits the reverse flow. For this reason, the relief valve 40 prevents fuel returned from the fuel injectors 11 to the fuel tank 30 from flowing through the return passage 38 toward the pressure reduction fuel passage 37. The relief valve 40 opens if the pressure of the pressure reduction fuel passage 37 becomes higher than a predetermined value, and returns the fuel inside the pressure reduction fuel passage 37 through the return passage 38 to the fuel tank 30. Therefore, the relief valve 40 can maintain the pressure of the fuel supplied from the first pressure storage chamber 33 to the fuel addition valve 35 at a predetermined value or less. Note that, the pressure at which the relief valve 40 opens, that is, the maximum pressure of the fuel supplied from the pressure reduction fuel passage 37 to the fuel addition valve 35, is set to a value lower than the pressure of the fuel stored in the first pressure storage chamber 33. Further, the pressure where the relief valve 40 opens is higher than the pressure where the first check valve 46 opens.

Further, the fuel addition system, like in the first embodiment, is provided with a control device controlling the supply pump 32, pressure reduction valve 39, and fuel addition valve 35. In the present embodiment, the ECU 60 corresponds to the control device. The ECU 60 detects or estimates the supplied fuel temperature and, if the fuel addition valve 35 injects fuel, controls the amount of discharge of the pressure reduction valve 39 so that the temperature of the fuel becomes the reference temperature or more. Due to this control, the fuel addition system can promote the increase of temperature of the fuel injected from the fuel addition valve 35 to the exhaust passage. In the third embodiment, the fuel temperature sensor 43 detecting the supplied fuel temperature is arranged between the first check valve 46 and the fuel addition valve 35 in the pressure reduction fuel passage 37. Note that the fuel temperature sensor 43 may be arranged at the inside of the fuel addition valve 35.

The ECU 60 increases the amount of discharge of the pressure reduction valve 39 if the supplied fuel temperature is lower than the reference temperature compared to if the supplied fuel temperature is the reference temperature or more. For example, the ECU 60 opens the pressure reduction valve 39 if the supplied fuel temperature is the reference temperature or less and closes the pressure reduction valve 39 if the supplied fuel temperature is the reference temperature or more. if closing the pressure reduction valve 39, fuel supplied by the feed pump 31 to the fuel addition valve 35 is injected from the fuel addition valve 35 to the inside of the exhaust pipe 27. For this reason, by closing the pressure reduction valve 39 if the supplied fuel temperature is the reference temperature or more, it is possible to reduce the load of the supply pump 32.

Further, the ECU 60 may increase the amount of discharge of the pressure reduction valve 39 if the supplied fuel temperature is lower than the reference temperature compared to if the supplied fuel temperature is the reference temperature or more, calculate the pressure pulsation of the fuel discharged from the first pressure storage chamber 33 through the pressure reduction valve 39, and synchronize the injection timing of the fuel addition valve 35 with the pressure pulsation. Specifically, the ECU 60 estimates the time when the peak of the pressure at pressure pulsation reaches the fuel addition valve 35, and injects fuel from the fuel addition valve 35 so that the peak of the pressure and the injection timing of the fuel addition valve 35 match. By doing this, high pressure state fuel is injected into the exhaust pipe 27, so boiling of the fuel due to reduction of the pressure and in turn vaporization and atomization of the fuel can be promoted.

For example, the ECU 60 calculates the time when the peak of the Pressure in pressure pulsation reaches the fuel addition valve 35 based on the temperature and pressure of the fuel exhausted into the pressure reduction fuel passage 37 and the length of the pressure reduction fuel passage 37. The temperature of the fuel discharged into the pressure reduction fuel passage 37 is detected using the fuel temperature sensor 43 detecting the supplied fuel temperature for controlling the pressure reduction valve 39. Further, the ECU 60 may estimate the supplied fuel temperature based. on the output of an outside air temperature sensor detecting the outside air temperature of the internal combustion engine 100, an output of a water temperature sensor detecting a temperature of the cooling water of the internal combustion engine 100, the amount of discharge of the pressure reduction valve 39, etc. In this case, the fuel temperature sensor 43 may be omitted.

Further, the fuel addition system is provided with a fuel pressure sensor 48 detecting the pressure of the fuel discharged into the pressure reduction fuel passage 37. The fuel pressure sensor 48 is arranged at the pressure reduction fuel passage 37. The fuel pressure sensor 48 is electrically connected to the ECU 60, and the output of the fuel pressure sensor 48 is sent to the ECU 60. The ECU 60 uses the fuel pressure sensor 48 to detect the pressure of the fuel discharged into the pressure reduction fuel passage 37.

Explanation of Control Using Time Chart

Figure 7:
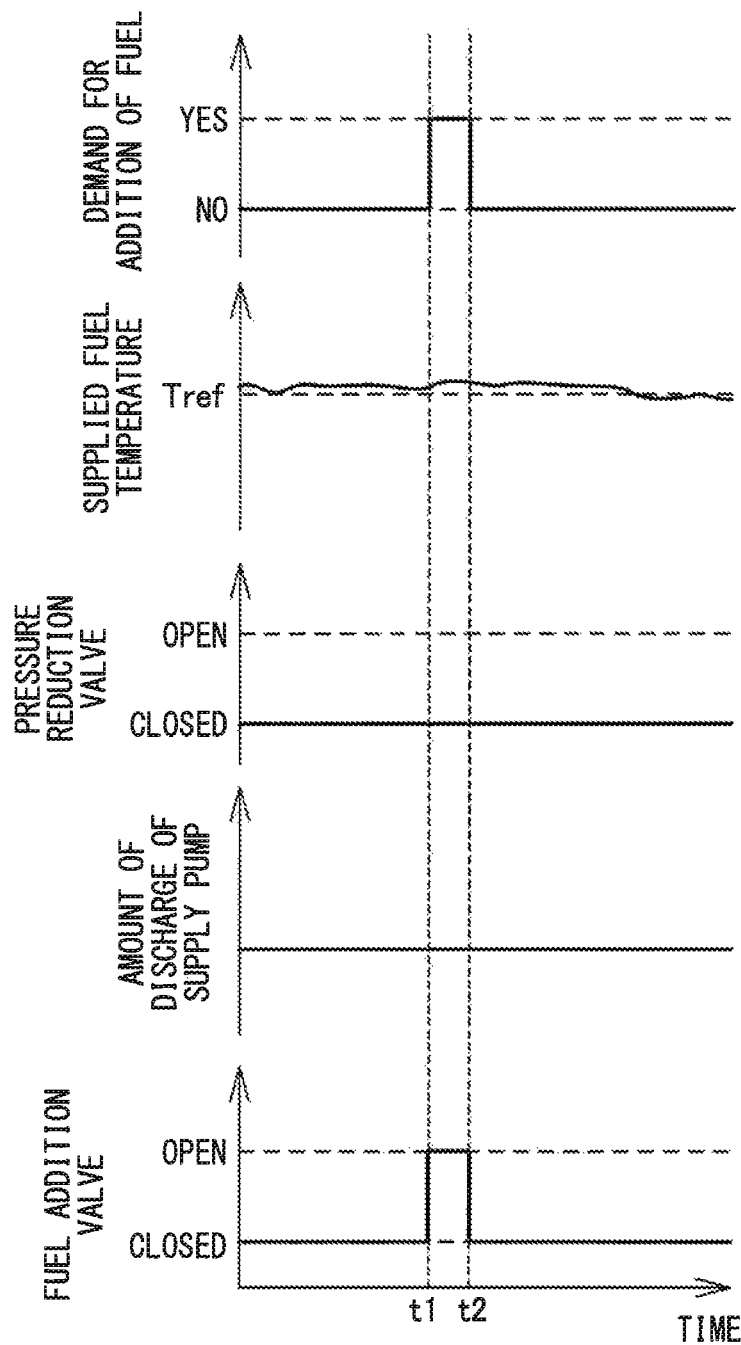
FIG. 7 is a time chart of presence of any demand for addition of fuel etc.

FIG. 7 is a schematic time chart of the presence of any demand for addition of fuel, supplied fuel temperature, opening/closing of the pressure reduction valve 39, amount of discharge of the supply pump 32, and opening/closing of the fuel addition valve 35. FIG. 7 shows the case where the supplied fuel temperature is the reference temperature Tref or more when the addition of fuel is demanded.

In the example shown in FIG. 7, at the time t1, the addition of fuel, that is, fuel injection of the fuel addition valve 35, is demanded. The supplied fuel temperature at this time is the reference temperature Tref or more. For this reason, at the time t1, the pressure reduction valve 39 is not opened but the fuel addition valve 35 is opened, and fuel injection is started from the fuel addition valve 35. In this case, the fuel supplied by the feed pump 31 to the fuel addition valve 35 is injected from the fuel addition valve 35. Further, the pressure reduction valve 39 is not opened, so at the time t1, the amount of discharge of the supply pump 32 also is not increased.

When a predetermined amount of fuel is injected from the fuel addition valve 35 to the inside of the exhaust pipe 27, at the time t2, the fuel addition valve 35 is closed and the injection of fuel of the fuel addition valve 35 is stopped. Further, in the fuel injection period from the time t1 to the time t2, fuel is injected from the fuel addition valve 35 so that the peak of pressure of the fuel and the injection timing of the fuel addition valve 35 match. Note that in the example of FIG. 7, the pressure reduction valve 39 is constantly closed, but to lower the common rail pressure, the pressure reduction valve 39 may be temporarily opened.

On the other hand, when addition of fuel is demanded, if the supplied fuel temperature is lower than the reference temperature Tref, control similar to the time chart of FIG. 3 is performed. In this case, in the fuel injection period from the time t2 to the time t3, fuel is injected from the fuel addition valve 35 so that the peak of pressure of the fuel and the injection timing of the fuel addition valve 35 match.

Processing for Addition of Fuel

Figure 8:
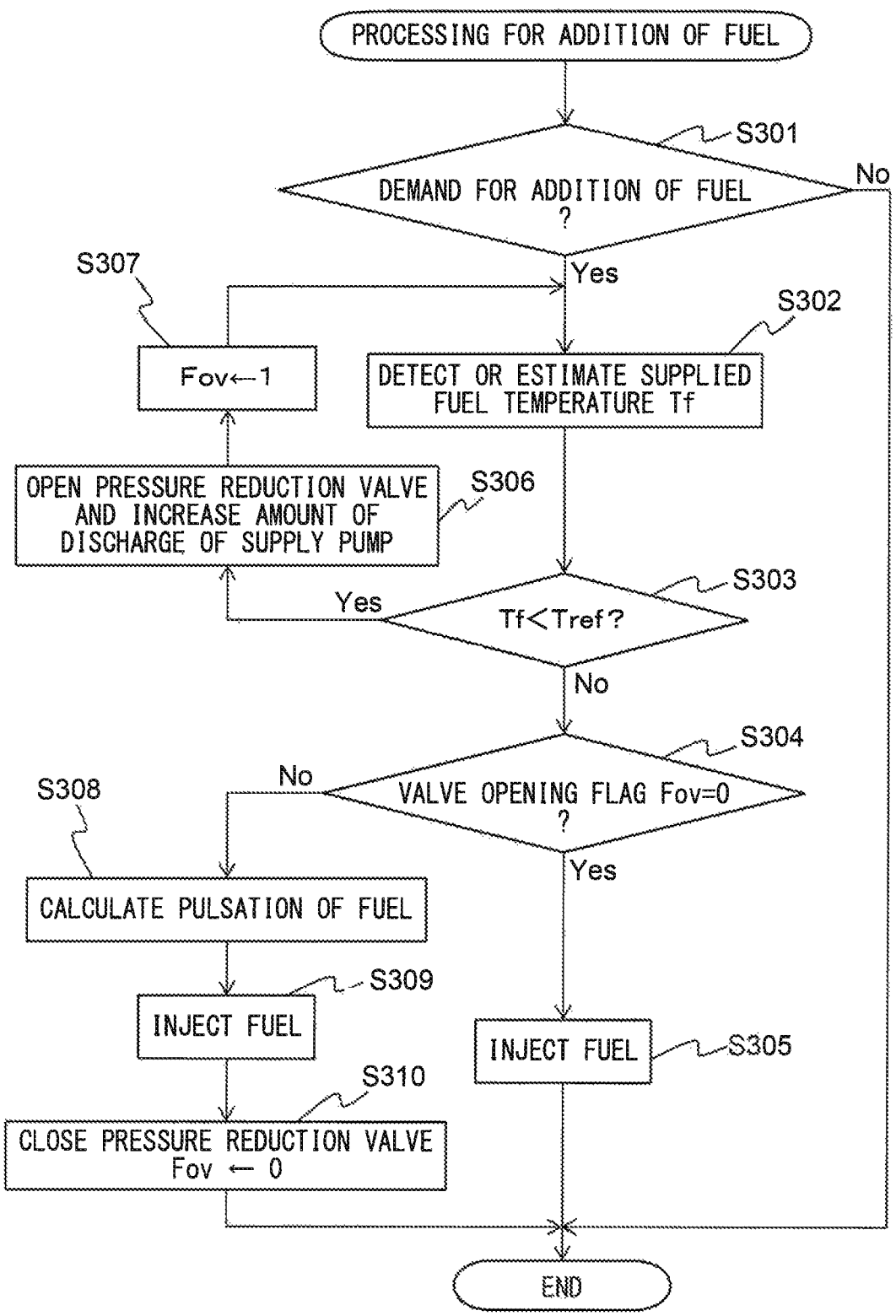
FIG. 8 is a flow chart showing a control routine of processing for fuel addition in the third embodiment of the present invention.

Below, referring to the flow chart of FIG. 8, the control in the third embodiment when using the fuel addition system to add fuel to the exhaust passage will be explained. FIG. 8 is a flow chart showing a control routine of processing for addition of fuel in the third embodiment of the present invention. The present control routine is repeatedly performed by the ECU 60 after the startup of the internal combustion engine 100.

First, at step S301, in the same way as step S101 of FIG. 4, it is judged whether there is a demand for addition of fuel, that is, if there is a demand for fuel injection from the fuel addition valve 35. If it is judged that there is no demand for addition of fuel, the present control routine is ended. On the other hand, if it is judged that there is a demand for addition of fuel, the present control routine proceeds to step S302.

At step S302, in the same way as step S103 of FIG. 4, the supplied fuel temperature Tf is detected or estimated. Next, at step S303, in the same way as step S104 of FIG. 4, it is judged whether the supplied fuel temperature Tf is lower than the reference temperature Tref. If at step S303 it is judged that the supplied fuel temperature Tf is the reference temperature Tref or more, the present control routine proceeds to step S304.

At step S304, it is judged whether the valve opening flag Fov is zero. The valve opening flag Fov is a flag showing an opening and closing state of the pressure reduction valve 39. The valve opening flag Fov, in the present control routine, is set to "1" when the pressure reduction valve 39 is opened and is set to zero when the pressure reduction valve 39 is closed. The initial value of the valve opening flag Fov is zero.

If at step S304 it is judged that the valve opening flag Fov is zero, the present control routine proceeds to step S305. At step S305, a predetermined amount of fuel is injected from the fuel addition valve 35. After step S305, the present control routine is ended.

On the other hand, if at step S303 it is judged that the supplied fuel temperature Tf is lower than the reference temperature Tref, the present control routine proceeds to step S306. At step S306, to increase the supplied fuel temperature, the pressure reduction valve 39 is opened. Further, to suppress a pressure drop in the fuel stored in the first pressure storage chamber 33, the amount of discharge pf the supply pump 32 is increased. Next, at step S307, the valve opening flag Fov is set to "1".

After step S307, the present control routine returns to step S302. Therefore, the state where the pressure reduction valve 39 is opened and the amount of discharge of the supply pump 32 is increased is maintained until the supplied fuel temperature Tf becomes the reference temperature Tref or more. For this reason, if the supplied fuel temperature Tf is lower than a predetermined temperature Tref when addition of fuel is demanded, the opening time of the pressure reduction valve 39 is made longer and the amount of discharge of the pressure reduction valve 39 is increased.

Further, if at step S304 it is judged that the valve opening flag Fov is "1", the present control routine proceeds to step S308. At step S308, the above-mentioned method is used to calculate the pulsation of fuel discharged through the pressure reduction valve 39 from the first pressure storage chamber 33. Next, at step S309, fuel is injected from the fuel addition valve 35 so that the peak of the pressure of the fuel and the injection timing of the fuel addition valve 35 match. Next, at step S310, the pressure reduction valve 39 is closed, and the valve opening flag Fov is set to zero. After step S310, the present control routine is ended.

Above, preferred embodiments according to the present invention were explained, but the present invention is not limited to these embodiments. Various corrections and changes may be made within the scope of the language in the claims. For example, as the fuel injected from the fuel addition valve 35 to the exhaust passage, a fuel such as biodiesel fuel may be used. Further, a heater or other temperature increasing means may be jointly used to raise the temperature of the fuel injected from the fuel addition valve 35 to the exhaust passage.

Further, the above-mentioned embodiments can be freely combined. For example, if combining the second embodiment and third embodiment, step S204 and step S205 in FIG. 5 are performed between step S302 and step S303 in FIG. 8.

Reference Signs List 10. cylinder
11. fuel injector
27. exhaust pipe
30. fuel tank
32. supply pump
33. first pressure storage chamber
35. fuel addition valve
37. pressure reduction fuel passage
39. pressure reduction valve
60. electronic control unit (EC)
100, 100'. internal combustion engine

The invention claimed is:

1. A fuel addition system comprising:
a fuel addition valve injecting fuel into an exhaust passage of an internal combustion engine,
a fuel tank storing fuel,
a first pressure storage chamber storing fuel to be supplied to a fuel injector provided in a cylinder of the internal combustion engine,
a supply pump increasing a pressure of fuel inside the fuel tank and supplying the fuel to the first pressure storage chamber,
a pressure reduction valve discharging fuel stored in the first pressure storage chamber to thereby lower the pressure of the first pressure storage chamber,
a pressure reduction fuel passage supplying fuel discharged from the first pressure storage chamber through the pressure reduction valve to the fuel addition valve, and
a control device configured to control the fuel addition valve and the pressure reduction valve, wherein
the control device is configured to detect or estimate a temperature of fuel supplied to the fuel addition valve and, when injecting fuel from the fuel addition valve, control an amount of fuel discharged from the first pressure storage chamber through the pressure reduction valve so that the temperature of the fuel becomes a reference temperature or more.

2. The fuel addition system according to claim 1, wherein the control device is configured to increase the amount of the fuel if the temperature of the fuel is lower than the reference temperature compared to if the temperature of the fuel is the reference temperature or more.

3. The fuel addition system according to claim 2, further comprising a second pressure storage chamber arranged in the pressure reduction fuel passage and storing fuel to be supplied to the fuel addition valve.

4. The fuel addition system according to claim 2, further comprising a feed pump supplying fuel inside the fuel tank to the fuel addition valve.

5. The fuel addition system according to claim 4, wherein the control device is configured to increase the amount of the fuel increase if the temperature of the fuel is lower than the reference temperature compared to if the temperature of the fuel is the reference temperature or more, calculate a pressure pulsation of the fuel discharged from the first pressure storage chamber through the pressure reduction valve, and synchronize an injection timing of the fuel addition valve with the pressure pulsation.

6. The fuel addition system according to claim 5, further comprising a first check valve preventing backflow of fuel supplied from the first pressure storage chamber through the pressure reduction valve to the fuel addition valve, and a second check valve preventing backflow of fuel supplied by the feed pump to the fuel addition valve.

7. The fuel addition system according to claim 4, further comprising a first check valve preventing backflow of fuel supplied from the first pressure storage chamber through the pressure reduction valve to the fuel addition valve, and a second check valve preventing backflow of fuel supplied by the feed pump to the fuel addition valve.

8. The fuel addition system according to claim 1, further comprising a second pressure storage chamber arranged in the pressure reduction fuel passage and storing fuel to be supplied to the fuel addition valve.

9. The fuel addition system according to claim 1, further comprising a feed pump supplying fuel inside the fuel tank to the fuel addition valve.

10. The fuel addition system according to claim 9, wherein the control device is configured to increase the amount of the fuel increase if the temperature of the fuel is lower than the reference temperature compared to if the temperature of the fuel is the reference temperature or more, calculate a pressure pulsation of the fuel discharged from the first pressure storage chamber through the pressure reduction valve, and synchronize an injection timing of the fuel addition valve with the pressure pulsation.

11. The fuel addition system according to claim 10, further comprising a first check valve preventing backflow of fuel supplied from the first pressure storage chamber through the pressure reduction valve to the fuel addition valve, and a second check valve preventing backflow of fuel supplied by the feed pump to the fuel addition valve.

12. The fuel addition system according to claim 9, further comprising a first check valve preventing backflow of fuel supplied from the first pressure storage chamber through the pressure reduction valve to the fuel addition valve, and a second check valve preventing backflow of fuel supplied by the feed pump to the fuel addition valve.

13. The fuel addition system according to claim 1, further comprising a return passage returning fuel discharged from the first pressure storage chamber through the pressure reduction valve to the fuel tank, and a relief valve arranged in the return passage so as to maintain a pressure of fuel supplied from the first pressure storage chamber to the fuel addition valve at a predetermined value or less.

14. The fuel addition system according to claim 1, wherein the control device is configured to detect or estimate an exhaust temperature inside the exhaust passage and calculate the reference temperature based on the exhaust temperature.

* * * * *